2,973,373
BIS-(2,3-EPOXYCYCLOPENTYL) ETHER

Benjamin Phillips and Paul S. Starcher, Charleston, W. Va., assignors to Union Carbide Corporation, a corporation of New York No Drawing. Filed July 27, 1956, Ser. No. 600,386

1 Claim. (Cl. 260—348)

This invention is directed to the production of an organic compound heretofore unknown to the art. More particularly, this invention relates to the provision of bis-(epoxycyclopentyl) compounds that are useful in the synthetic resins art.

The compound to which this invention is particularly directed is bis-(2,3-epoxycyclopentyl) ether and can be represented by the graphic formula:

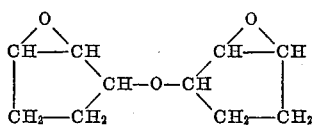

In accordance with this invention, bis-(2,3-epoxycyclopentyl) ether can be prepared by the epoxidation of bis-(2-cyclopentyl) ether with a suitable epoxidizing agent, such as, for example, acetaldehyde monoperacetate, peracetic acid, perbenzoic acid, and the like. This epoxidation reaction can be prepresented by the following equation wherein the epoxidizing agent used is peracetic acid:

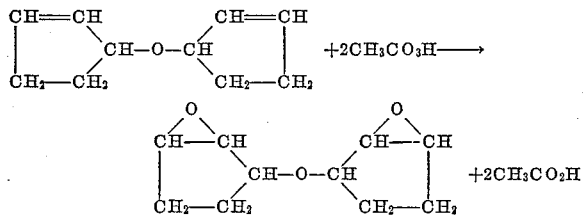

The epoxidation reaction may be effected and characterized similarly with acetaldehyde monoperacetate as the epoxidizing agent in place of peracetic acid, wherein, however, one mole of acetaldehyde is formed in addition to one mole of acetic acid as by-product per mole of acetaldehyde monoperacetate reacted.

The starting material, bis-(2-cyclopentenyl) ether, itself can be prepared from cyclopentadiene, in accordance with known procedures. For example, cyclopentadiene can be hydrochlorinated with anhydrous hydrogen chloride in a suitable solvent, such as benzene, or without a solvent, for a period of about one hour at low temperatures of the order of 0° C. to −15° C. In this manner, 1-chloro-2-cyclopentene can be obtained. Subsequently, 1-chloro-2-cyclopentene can be subjected to alkaline hydrolysis with sodium carbonate or sodium hydroxide to produce bis-(2-cyclopentenyl) ether. A refined, substantially pure, bis-(2-cyclopentenyl) ether then can be obtained by any suitable separation procedure, for example, by fractional distillation. For example, the materials formed by the alkaline hydrolysis reaction can be fed to a still fitted with a glass-packed column. A substantially pure cut of bis-(2-cyclopentenyl) ether can be obtained at a temperature of 82° C. at a pressure of ten millimeters of mercury, absolute.

The epoxidation reaction can be carried out by charging bis-(2-cyclopentenyl) ether to a reaction vessel and then gradually adding the epoxidizing agent. When employing acetaldehyde monoperacetate or peracetic acid, it is preferable to use a solvent, in order to provide ease of handling and to remove the explosion hazard which attends the handling of highly concentrated or crystalline peracetic acid. Thus, acetaldehyde monoperacetate or peracetic acid can be employed as a solution in a suitable solvent which includes, for example, acetone, chloroform, methylethyl ketone, ethyl acetate, butyl acetate, and the like.

The epoxidation reaction can be conducted at a temperature within the range from −25° C. to 150° C. Longer reaction times are preferred at the lower temperatures to produce higher yields. At the higher temperatures, side reactions form undesirable materials which can be removed by purification procedures, such as, by fractional distillation. Reaction temperatures in the range of 10° C. to 90° C. are preferred.

The molar ratio of epoxidizing agent to bis-(2-cyclopentenyl) ether starting material can be varied over a wide range. As can be shown by a theoretical analysis, two moles of epoxidizing agent will completely epoxidize one mole of bis-(2-cyclopentenyl) ether. Excesses of one or the other reactant over the theoretical amount can be used without seriously affecting the reaction or its efficency, although a molar ratio from 0.5 to 2.5 moles of epoxidizing agent per mole of bis-(2-cyclopentenyl) ether is preferred.

The reaction conditions can be maintained and the reaction allowed to continue until an analysis for epoxidizing agent indicates that the reaction is substantially complete. When desired or after completion of the reaction, the solvent employed, any unreacted epoxidizing agent and acetic acid, or other materials, if any, formed during the reaction, can be removed from the reaction mixture. This can be expeditiously accomplished by feeding the reaction mixture into a still containing a potboiler or azeotroping agent, such as, ethylbenzene, toluene, which is refluxing under reduced pressure, and stripping the low-boiling components. The epoxidized product, bis-(2,3-epoxcyclopentyl) ether, can be recovered as residue and refined, as by fractional distillation.

If desired, a refined product may be obtained by fractionally distilling a crude product in a fractionating column, such as, a glass-packed column or Vigreux column. The absence of azeotrope formation and the wide separation of boiling points of the products and by-products of the epoxidation reaction at substantially all pressures are useful in obtaining sharp cuts of product in a fractionation process. For example, the products and by-products of an epoxidation reaction can be fed into a still to which is connected a fractionating column. A substantially pure cut of bis-(2,3-epoxycyclopentyl) ether can be obtained at temperatures from 110° C. to 120° C. at a pressure of 2.0 millimeters of mercury, absolute.

Several isomers (both geometrical and optical) of bis-(2,3-epoxycyclopentyl) ether are possible, and the product of this invention is probably a mixture of several or all of the possible isomers. It is possible to achieve some separation of these isomers by fractional distillation, crystallization, or adsorption, but most of the uses of this compound do not require any particular isomer. In fact, for epoxy resin uses, the liquid mixture of isomers is preferable because it is more convenient to handle.

The compound of this invention, bis-(2,3-epoxycyclopentyl) ether, is useful in the preparation of synthetic resins. For example, bis-(2,3-epoxycyclopentyl) ether can be mixed with a polyfunctional organic amine, such as, 1,6-hexanediamine, and brought to a temperature of about 120° C. to 160° C. to form a hard, transparent resin.

The following examples are presented. In these examples, the analyses for epoxy group content is based upon the reaction of epoxy groups with pyridine hydrochloride to form the corresponding chlorhydrin and pyridine. An analysis of this type may be performed by introducing into a pressure bottle, containing 25 milliliters of 1 N pyridine hydrochloride in chloroform, an amount of epoxide sample calculated to consume about 50 percent of the pyridine hydrochloride. The bottle is then sealed and the contents heated in a steam bath for a period of one hour. At the end of this time, the bottle and contents are cooled, ten drops of phenolphthalein indicator (1.0 gram per 100 milliliters of 60 percent ethanol) added, and the mixture titrated to a permanent red end point with standard 0.2 N alcoholic potassium hydroxide solution. A blank is also run in precisely the same fashion without, however, the inclusion of a sample. The amount of pyridine hydrochloride consumed can be determined and from this determination the amount of epoxide in the sample can be calculated.

The analyses in the examples for determining epoxidizing agent content, i.e., analyses for peracetic acid or acetaldehyde monoperacetate content, can be performed by introducing a 1.0 to 1.5 gram sample of unknown epoxidizing agent content into a flask containing a mixture of 60 milliliters of aqueous (50 weight percent) sulfuric acid and five milliliters of a saturated potassium iodide solution. The flask then is swirled to mix the solutions and then titrated immediately with a 0.1 N aqueous sodium thiosulfate solution to a colorless end point.

In order to determine the acetic acid content, another sample of approximately the same size is taken at the same time. This sample is introduced into a flask containing 100 milliliters of water and 15 milliliters of acetaldehyde. The flask and contents are allowed to stand for ten to fifteen minutes after mixing so as to permit whatever epoxidizing agent, such as, peracetic acid and/or acetaldehyde monoperacetate, present in the sample to be converted into acetic acid. The solution is then titrated with an 0.5 N sodium hydroxide solution using a phenolphthalein indicator. The amount of acetic acid in the original sample is then taken to be equal to the total acetic acid as determined by titration with sodium hydroxide, minus the amount of acetic acid coming from the reaction of peracetic acid with acetaldehyde, or from the decomposition of acetaldehyde monoperacetate, present in the sample. The amount of acetic acid formed by the side-reaction of peracetic acid with acetaldehyde, or from the decomposition of acetaldehyde monoperacetate, can be calculated from the previous sodium thiosulfate titration determination of epoxidizing agent content on the basis of two moles of acetic acid being formed from each mole of peracetic acid or acetaldehyde monoperacetate.

EXAMPLE 1

*Preparation of 1-chloro-2-cyclopentene*

To 1200 grams (18.15 moles) of cyclopentadiene there were added 587 grams (16.10 moles) of anhydrous hydrogen chloride. This addition was conducted in a dropwise manner over a period of 12 hours. During this time, the reaction mixture was continuously stirred and the temperature of the reaction mixture was maintained between −10° C. and −20° C. The reaction mixture then was distilled through a fractionation column and there was obtained 1240 grams of 1-chloro-2-cyclopentene, boiling in the temperature range from 17° C. to 23° C. at a reduced pressure of 4.0 millimeters of mercury, absolute. The yield thus obtained amounted to 75.5 percent of the calculated theoretrical yield.

EXAMPLE 2

*Preparation of bis-(2-cyclopentenyl) ether*

Twelve hundred and forty-four grams of 12.13 moles of 1-chloro-2-cyclopentene and fourteen hundred grams of an aqueous sodium hydroxide solution containing 37.8 percent by weight of sodium hydroxide (i.e., containing five hundred and thirty grams of sodium hydroxide) were added simultaneously to a well-stirred solution of 27.9 grams of sodium hydroxide in four thousand grams of water. An addition time of one hour and forty minutes was employed. The temperature was maintained at 50° C. during the addition and the addition rates were adjusted so that the reaction mixture was at all times basic, that is, having a pH of greater than eight. The reaction mixture separated into two layers during the reaction. After stirring for an additional hour, the layers were separated and the upper layer fractionated through a glass-packed column. Three hundred and thirty-seven grams of a fraction boiling at a temperature of 82° C. at ten millimeters of mercury, absolute, were obtained. This fraction was identified as bis-(2-cyclopentenyl) ether and had an index of refraction of 1.4858 with sodium light at 30° C. The yield of bis-(2-cyclopentenyl) ether was determined to be 37 percent of theoretical yield.

EXAMPLE 3

*Preparation of bis-(2,3-epoxycyclopentyl) ether*

Six hundred and eighty grams of a 33.5 percent by weight solution of peracetic acid in acetic acid, i.e., a solution containing about 3.0 moles or 228 grams of peracetic acid, were added to 150 grams, or 1.0 mole, of bis-(2,3-epoxycyclopentyl) ether. This addition was accomplished in about two hours and ten minutes during which time the reaction temperature was maintained between 26° C. and 35° C. The reaction mixture was then maintained at a temperature of about 25° C. for an additional 4⅔ hours and then stored for two days at a temperature of −6° C. The reaction mixture then was maintained at 25° C. for 2¾ hours longer and then added dropwise over a period of two hours and five minutes, to 500 grams of ethylbenzene refluxing at a temperature of 70° C. or below under reduced pressure. An additional 200 cubic centimeters of ethylbenzene was added during the addition of the reaction mixture. Low boiling materials including acetic acid and excess peracetic acid were stripped leaving a residue. Fractional distillation of the residue provided 145 grams (an 80 percent yield based on theoretical yield) of bis-(2,3-epoxycyclopentyl) ether having a boiling range of from 90° C. to 108° C. under a reduced pressure of 2.0 millimeters of mercury, absolute.

EXAMPLE 4

*Preparation of bis-(2,3-epoxycyclopentyl) ether*

Nine hundred and four grams of a 25.2 percent by weight solution of peracetic acid in acetone, i.e., a solution containing 3.0 moles of peracetic acid, were added slowly to 150 grams, or 1.0 mole, of bis-(2-cyclopentenyl) ether. This addition was accomplished in about three hours, during which time the temperature of the reaction mixture was continuously maintained between 26° C and 30° C. After stirring for an additional eight hours at about 30° C. and allowing to stand at −6° C. for about 40 hours, the reaction mixture was fed into ethylbenzene, refluxing at a temperature of 60° C. at 55 millimeters of mercury, absolute, to remove acetone, acetic acid formed during the reaction and unreacted peracetic acid. Low-boiling materials were stripped, leaving a residue. Fractional distillation of the residue resulted in 134 grams (a 74.6 percent yield based on the theoretical yield) of bis-(2,3-epoxycyclopentyl) ether having a boiling range of 102° C. to 113° C. under a reduced pressure of 2.5 to 2.8 millimeters of mercury, absolute.

EXAMPLE 5

*Preparation of bis-(2,3-epoxycyclopentyl) ether*

Three thousand and eighty-one grams of a 22.2 percent by weight solution of peracetic acid in acetone, i.e., a solution containing 9.0 moles of peracetic acid, were slowly added to 338 grams or 2.25 moles of bis-(2-cyclopentenyl) ether. This addition was accomplished in five hours during which time the temperature of the reaction mixture was continuously maintained between 25° C. and 35° C. After stirring for an additional day at room temperature of about 25° C. and allowing to stand for two days at −6° C., the reaction mixture was analyzed for peracetic acid consumption which indicated that the reaction was 95 percent complete.

The reaction mixture then was fed into refluxing ethylbenzene to remove the acetone, acetic acid coproduct formed by the reaction and excess peracetic acid. Low-boiling materials were stripped, leaving a residue. Fractional distillation of the residue resulted in 320 grams (78 percent yield based on theoretical) of bis-(2,3-epoxycyclopentyl) ether having a boiling point of 107° C. under a reduced pressure of 2.1 millimeters of mercury. Recrystallization of a solid mid-fraction from ethylbenzene produced a white crystalline product having a melting point of between 56° C. and 57° C. An elementary analysis of this product on the basis of $C_{10}H_{14}O_3$ provided the following results:

|  | Calculated, percent | Found, percent |
| --- | --- | --- |
| Carbon, C | 65.91 | 65.88 |
| Hydrogen, H | 7.69 | 7.81 |
| Oxygen, O | 26.40 | [1] 26.31 |

[1] Percent (by difference).

A purity of 96 percent of theoretical was found by epoxide titration with pyridine hydrochloride. This solid fraction is probably one of the all trans isomers of bis-(2,3-epoxycyclopentyl) ether.

EXAMPLE 6

*Preparation of bis-(2,3-epoxycyclopentyl) ether*

Four thousand six-hundred and seventy-four grams of a 23.95 percent by weight solution of peracetic acid in ethyl acetate, i.e., a solution containing 14.41 moles of peracetic acid, were slowly added to 1029 grams or 6.86 moles of bis-(2-cyclopentenyl) ether. This addition was accomplished in six hours, during which time the temperature of the reaction mixture was continuously maintained between 26° C. and 35° C. After stirring for an additional five hours at 30° C., the reaction mixture was analyzed for peracetic acid consumption which indicates that the reaction was 94.7 percent complete.

The reaction mixture then was fed into refluxing ethylbenzene to remove the ethyl acetate, acetic acid coproduct formed in the reaction and unreacted peracetic acid. Low-boiling materials were stripped, leaving a residue. Fractional distillation of the residue resulted in 974 grams (76 percent yield based on theoretical) of bis-(2,3-epoxycyclopentyl) ether having a boiling range of 110° C. to 120° C. under a reduced pressure of 2.0 millimeters of mercury. An elementary analysis of this product on the basis of $C_{10}H_{14}O_3$ provided the following results:

|  | Calculated, percent | Found, percent |
| --- | --- | --- |
| Carbon, C | 65.91 | 66.0 |
| Hydrogen, H | 7.69 | 7.8 |
| Oxygen, O | 26.40 | [1] 26.2 |

[1] Percent (by difference).

A purity of 96.8 percent of theoretical was found by epoxide titration with pyridine hydrochloride.

EXAMPLE 7

*Preparation of bis-(2,3-epoxycyclopentyl) ether*

Three thousand and two hundred fifty-five grams of a 23.35 percent by weight solution of peracetic acid in ethyl acetate, i.e., a solution containing 10.0 moles of peracetic acid, were slowly added to 600 grams, or 4.0 moles, of bis-(2-cyclopentenyl) ether. This addition was accomplished in seven hours during which time the temperature of the reaction mixture was continuously maintained between 37° C. and 43° C. After stirring for an additional five hours at 42° C., the reaction mixture was analyzed for peracetic acid consumption which indicated that the reaction was 97.8 percent complete.

The reaction mixture then was fed into refluxing ethylbenzene to remove the ethyl acetate, acetic acid coproduct formed by the reaction and unreacted peracetic acid. Fractional distillation of the residue resulted in 615 grams (84.3 percent yield based on theoretical) of bis-(2,3-epoxycyclopentyl) ether having a boiling range of 111° C. to 119° C. under a reduced pressure of 2.0 millimeters of mercury. A purity of 96.1 percent of theoretical was found by epoxide titration with pyridine hydrochloride.

EXAMPLE 8

*Resin from bis-(2,3-epoxycyclopentyl) ether*

A mixture was prepared from 0.43 gram of 1,6-hexanediamine and 0.92 gram of bis-(2,3-epoxycyclopentyl) ether. The proportions of 1,6-hexanediamine and bis-(2,3-epoxycyclopentyl) ether in this mixture were calculated as containing 1.5 amine hydrogen atoms for each epoxy group. The mixture was placed in a mold and heated at a temperature of 120° C. for about 18 minutes during which time a gel formed. The gel was heated for three hours at a temperature of about 160° C. A transparent resin having a Barcol hardness of 30 was formed. Resins prepared in this manner are useful in making a large variety of articles of manufacture, such as for example, buttons, combs, brush handles, paper weights, ink stands and the like.

The compound of this invention, bis-(2,3-epoxycyclopentyl) ether, is also useful as a stabilizer in polyvinylchloride and polyvinylidenechloride resins compositions.

In addition, this compound readily polymerizes in the presence of acidic catalysts. For example, small amounts of boron trifluoride-ether complex caused rapid polymerization of bis-(2,3-epoxycyclopentyl) ether to a hard, infusible resin. Such resins are useful in making a large variety of articles of manufacture as previously specified.

What is claimed is:

A compound represented by the formula:

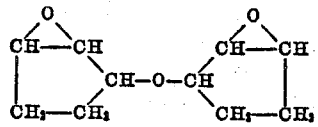

No references cited.